F. J. SINGER.
RADIATOR.
APPLICATION FILED JAN. 26, 1916.
1,224,677.
Patented May 1, 1917.
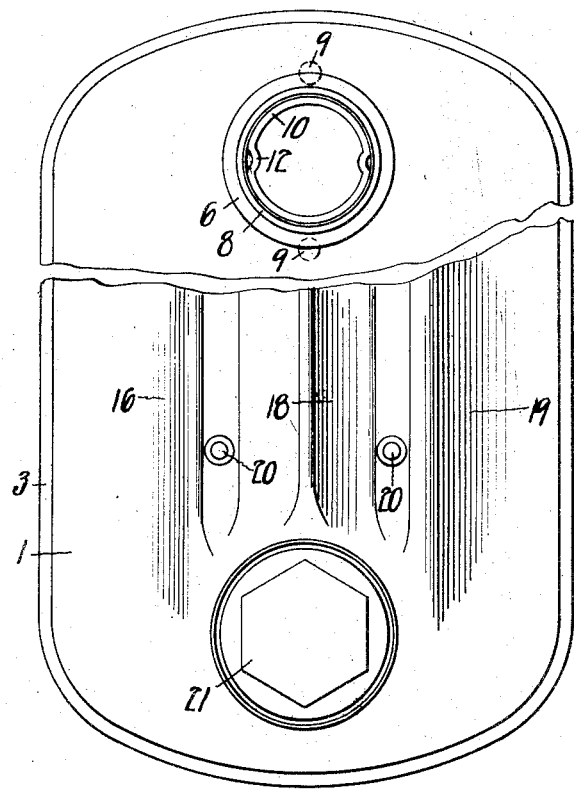
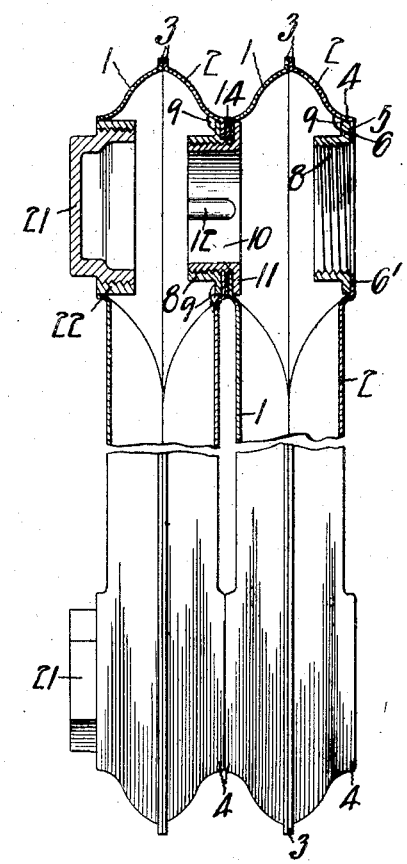
Witness
E. R. Barrett
Inventor
Frank J. Singer,
By Pagelsen & Spencer,
Attorneys

UNITED STATES PATENT OFFICE.

FRANK J. SINGER, OF DETROIT, MICHIGAN, ASSIGNOR TO AMERICAN PRESSWELD RADIATOR CORPORATION, OF DETROIT, MICHIGAN, A CORPORATION OF DELAWARE.

RADIATOR.

1,224,677.   Specification of Letters Patent.   Patented May 1, 1917.

Application filed January 26, 1916.   Serial No. 74,293.

*To all whom it may concern:*

Be it known that I, FRANK J. SINGER, a citizen of the United States, and residing at Detroit, in the county of Wayne and State of Michigan, have invented a new and Improved Radiator, of which the following is a specification.

The present invention relates to pressed metal radiators and its object is to provide very cheaply a construction wherein the sections may be readily and tightly coupled together. More specifically, the invention comprises a radiator, the sections of which are flanged around alined openings together with an outer threaded coupling member engaging the inner face of the flange of one of the sections and an inner coupling member engaging the inner face of the flange of the other section and threaded into the outer coupling member. The invention also consists in an inner flanged pressed metal coupling member having its flange in turning engagement with the inner surface of an annular flange on the adjacent radiator section, and having lugs pressed inwardly from the threaded portion whereby force may be applied to the inner coupling member to turn the latter into the outer coupling member and clamp the sections together; also in the details of construction shown, described and claimed.

The invention, although designed particularly for radiators, is obviously capable of application for connecting sections of various containers or conduits.

In the drawings, Figure 1 is a side elevation, parts being broken away, showing a preferred embodiment of the invention. Fig. 2 is a view at right angles to Fig. 1. Fig. 3 is a vertical section through the inner nipple. Fig. 4 is an elevation corresponding to Fig. 3.

In the embodiment of the invention shown, each of the pressed steel sections is made of halves 1 and 2 joined to each other by welding along the out-turned meeting flanges 3, but it will be understood that other seams may be employed in lieu of the welded connection. The half sections are pressed outwardly at top and bottom to form bosses 4 that terminate in the flat inturned annular flanges 5 against which an annular flange 6 of an internally threaded coupling member 8 bears. The coupling member 8 is inserted into the corresponding section prior to welding the joint 3 and may be secured in place by welding or soldering, but preferably by brazing to the boss at a plurality of points 9, (Fig. 2) thus allowing the flat machined face 6' of the flange 6 to come into direct bearing engagement throughout with the inner surface of the flange 5.

The section 1—2 adjacent that to which reference has just been made has inserted therein before its seam 3 is closed an inner threaded coupling member 10 having an annular flange 11 arranged to bear upon the inner surface of the corresponding flange 5 while its threaded end projects through the openings in the bosses and is received in the member 8. The coupling members are preferably formed from pressed metal and the member 10 has a plurality of longitudinal lugs 12 pressed therein prior to the threading operation—this construction being exceedingly cheap; it also possesses greater strength than ordinary fittings and has no seam. Interposed between the flanges 5 is an annular washer 14, preferably of paper.

When the sections are to be connected, a rectangular bar or similar tool (not shown) is inserted into the loose coupling member 10 and through contact of its edges with the lugs 12 the latter is screwed into the member 8 and the parts are drawn tightly together. It is not necessary, in order to allow this action to take place, to have the member 8 secured to its boss by a fused connection of strength sufficient to resist the entire turning moment exerted on the tool; on the other hand, as greater stress is placed upon the tool, the flange 6 seats itself throughout on the adjacent flange 5 and the tendency to turn is largely prevented by friction. Thus the brazing of the member 8 to its boss is a comparatively simple matter and may be rapidly accomplished.

The radiator section may be made in various forms, that shown comprising three flutings 16, 18 and 19, the depressions being deep enough to bring the half sections into close contact with one another to allow the use of connecting rivets 20. The end sections are closed by threaded plugs 21 received in nipples 22.

The details of the construction may obviously be changed considerably without departing from the spirit of the invention, and I do not, therefore, wish to be limited except as indicated by the subjoined claim.

I claim:—

A sectional container comprising two thin metal sections having alined openings therein and flat annular flanges surrounding said openings, an outer internally threaded coupling member bearing on the inner face of the flange of one of the sections, and an inner externally threaded tubular coupling member projecting through the openings in the sections and bearing on the inner face of the flange on the other section and also being screwed into the first mentioned coupling member to draw the sections of the container together, said externally threaded coupling member having a lug projecting inwardly therefrom and having a depression in its external surface corresponding thereto.

In testimony whereof I sign this specification.

FRANK J. SINGER.